(12) United States Patent
Shi et al.

(10) Patent No.: US 10,968,017 B2
(45) Date of Patent: Apr. 6, 2021

(54) INDUCTION HEAT SEAL LINER AND METHOD OF MANUFACTURE

(71) Applicant: Tekni-Plex, Inc., Wayne, PA (US)

(72) Inventors: Guangda Shi, Perrysburg, OH (US); Phil Bourgeois, Perrysburg, OH (US)

(73) Assignee: Tekni-Plex, Inc., Wayne, PA (US)

( * ) Notice: Subject to any disclaimer, the term of this patent is extended or adjusted under 35 U.S.C. 154(b) by 60 days.

(21) Appl. No.: 16/290,066

(22) Filed: Mar. 1, 2019

(65) Prior Publication Data

US 2020/0277113 A1 Sep. 3, 2020

Related U.S. Application Data (63) Continuation of application No. 16/290,030, filed on Mar. 1, 2019.

(51) Int. Cl.
  *B65D 53/04* (2006.01)
  *B65D 47/08* (2006.01)
  (Continued)

(52) U.S. Cl.
  CPC .............. *B65D 53/04* (2013.01); *B32B 7/12* (2013.01); *B32B 15/08* (2013.01); *B65D 41/04* (2013.01);
  (Continued)

(58) Field of Classification Search
  CPC ... B65D 51/1605; B65D 51/20; B65D 41/045
  (Continued)

(56) References Cited

U.S. PATENT DOCUMENTS 3,951,293 A    4/1976  Schultz
4,685,580 A *  8/1987  Towns ............... B65D 41/0435
                                                215/260

(Continued)

FOREIGN PATENT DOCUMENTS

EP       2465790 A1    6/2012
WO    2017058886 A1    4/2017

OTHER PUBLICATIONS

International Search Report in International Application No. PCT/US2016/012324 dated Mar. 11, 2016.
(Continued)

*Primary Examiner* — James N Smalley
(74) *Attorney, Agent, or Firm* — Polsinelli, PC (57) ABSTRACT

Induction heat-seal liner that allows a visual inspection of the product in the container to be made through the seal, and/or an aroma from the product to be detected through the seal, while the seal remains secured to the container to protect against leakage or contamination. In one embodiment, the liner has an intermediate metal-foil layer having a central opening, and a central liner portion, aligned in a thickness direction with a central opening of a metal-foil layer, comprises one or more materials or spaces that provide visibility into and/or aroma penetration from the open mouth of the container. In another embodiment, a dual heat-seal liner having a dispensing aperture is provided that heat seal bonds to both the cap and container to form a non-removable closure assembly that protects the metal-foil layer from degradation by the product being dispensed.

36 Claims, 9 Drawing Sheets

(51) Int. Cl.
*B65D 41/04* (2006.01)
*B32B 15/08* (2006.01)
*B32B 7/12* (2006.01)
*B65D 65/40* (2006.01)
*B65D 51/16* (2006.01)
*B65D 51/20* (2006.01)

(52) U.S. Cl.
CPC ........... *B65D 41/045* (2013.01); *B65D 47/08* (2013.01); *B65D 51/1605* (2013.01); *B65D 51/20* (2013.01); *B65D 65/40* (2013.01); *B32B 2435/02* (2013.01)

(58) Field of Classification Search
USPC .............................. 220/359.1–359.4; 215/232
See application file for complete search history.

(56) References Cited

U.S. PATENT DOCUMENTS

| | | | |
|---|---|---|---|
| 4,789,074 A | 12/1988 | Han | |
| 4,863,051 A | 9/1989 | Eibner et al. | |
| 5,176,271 A | 1/1993 | Painchaud et al. | |
| 5,577,625 A * | 11/1996 | Baird | B65D 47/0838 |
| | | | 215/235 |
| 5,579,936 A | 12/1996 | Costa et al. | |
| 5,688,544 A | 11/1997 | Bolton | |
| 5,730,306 A | 3/1998 | Costa et al. | |
| 5,988,448 A * | 11/1999 | Foth | B65D 47/243 |
| | | | 222/189.09 |
| 6,065,642 A | 5/2000 | Brown | |
| 6,378,715 B1 | 4/2002 | Finkelstein et al. | |
| 6,602,309 B2 * | 8/2003 | Vizulis | B65D 53/04 |
| | | | 215/230 |
| 6,983,857 B2 * | 1/2006 | Miller | B65D 51/165 |
| | | | 215/270 |
| 7,163,113 B2 | 1/2007 | Manganiello et al. | |
| 7,342,501 B2 | 3/2008 | Abbott | |
| 7,461,754 B2 | 12/2008 | Walsh | |
| 7,648,764 B2 | 1/2010 | Yousif | |
| 7,900,789 B2 | 3/2011 | Johnston et al. | |
| 7,909,204 B2 | 3/2011 | Antal, Sr. | |
| 7,959,028 B2 | 6/2011 | Leon | |
| 8,080,118 B2 | 12/2011 | Yousif | |
| 8,220,649 B2 | 7/2012 | Walsh | |
| 8,225,954 B1 | 7/2012 | Triquet | |
| 9,708,110 B2 | 7/2017 | Walsh | |
| 9,834,331 B2 | 12/2017 | Bruna | |
| 10,589,917 B1 * | 3/2020 | Mir | B65D 75/5838 |
| 2001/0023870 A1 | 9/2001 | Mihalov et al. | |
| 2004/0262418 A1 | 12/2004 | Smith et al. | |
| 2005/0252918 A1 | 11/2005 | McKnight et al. | |
| 2006/0228620 A1 | 10/2006 | Martinson et al. | |
| 2008/0260917 A1 | 10/2008 | Sankey et al. | |
| 2009/0230078 A1 * | 9/2009 | Walsh | B65D 51/1616 |
| | | | 215/261 |
| 2009/0250464 A1 | 10/2009 | Jongsma et al. | |
| 2011/0089177 A1 | 4/2011 | Thorstensen-Woll | |
| 2012/0111758 A1 | 5/2012 | Lo | |
| 2013/0341325 A1 | 12/2013 | Bruna | |
| 2014/0061196 A1 | 3/2014 | Thorstensen-Woll | |
| 2014/0076898 A1 | 3/2014 | Wiening | |

OTHER PUBLICATIONS

Written Opinion in International Application No. PCT/US2016/012324 dated Mar. 11, 2016.
International Search Report and Written Opinion in related International Application Na PCT/US2020/019780 dated Jul. 2, 2020.

* cited by examiner

INDUCTION HEAT SEAL LINER AND METHOD OF MANUFACTURE

FIELD OF THE INVENTION

The present invention relates to induction heat-seal liners for sealing the mouth of a container and a method of manufacture. In one embodiment, a heat-seal liner allows an aroma of a product in the container to permeate the seal, and/or allows visual detection of the product, while maintaining the barrier properties of the seal and preventing leakage of the substance from the container. In another embodiment, a dual heat-seal liner having a dispensing aperture is provided that heat seal bonds to both the cap and container to form a non-removable closure assembly that protects the metal-foil layer from degradation by the product being dispensed.

BACKGROUND OF THE INVENTION

Seals have been used on containers for many years, to prevent leakage or contamination of the substance within the container and to increase the shelf life of the product. For example, seals are used on containers for cosmetics, foods, drinks, medicines and other items in the form of creams, gels, powders, or liquids. Seals used for this purpose are typically placed over the opening of the container or, in some instances, within the cap on the container.

However, consumers often want to smell items having a fragrance or aroma, such as lotions, creams, body washes, shampoos, deodorants, perfumes, laundry detergents, air fresheners, coffee and spices, before purchasing the items. As a result, many products are sold today without seals because there is no commercially viable seal on the market that allows consumers to smell the scent of the product within the container. Specifically, prior art seals are essentially hermetic seals intended to prevent leakage of the product from the container and to limit air flow into and out of the container to preserve the product and maximize the product's shelf life. In so doing, they trap the scent or aroma of the product within the container.

As a result, scented products are often sold in containers without seals, so that consumers can remove the cap and smell the scent prior to purchase. The fact that many scented products are still sold in containers without seals today is evidence that the prior art seals do not allow adequate scent permeation and prevent leakage in a cost effective manner.

The absence of a seal increases the possibility of spillage during transportation and the chances that a product may be tampered with or tainted prior to sale to the consumer. It is not uncommon for consumers to go beyond simply removing the cap and smelling the item, by actually applying some of the product onto their body to sample the product and its fragrance. In so doing, the consumer may stick their fingers into the substance or on the opening where the substance comes out. Oftentimes, after sampling the product, the consumer closes the cap and returns the container to the shelf in the store.

This sampling of the product causes several problems. From the consumer's perspective, by placing their fingers into the substance and/or coming in contact with the opening where the substance comes out, the sampler may be contaminating the substance and spreading germs/bacteria. Additionally, each time a consumer samples the product and then returns it to the shelf, the volume of the substance within the container decreases. As a result, the consumer that eventually purchases the product is unknowingly purchasing less than a full container of a product that may have been contaminated and/or contain germs/bacteria.

From the retailer's perspective, consumers that sample products and then return them to the shelf sometimes do not place the cap on tightly, which may result in spillage if the container is tilted or falls on its side. Additionally, the shelf life of the substance within the container may be reduced or altered by the absence of a seal on the container or having been opened and exposed to the surrounding environmental conditions by a sampling consumer prior to sale. Also, the absence of a seal on a container may result in the substance contacting and/or accumulating within the cap on the container, which may cause spillage when the cap is removed and a less appealing presentation to the consumer. These situations may result in the retailer being unable to sell the product or generating product returns or charge-backs, which may have an adverse effect on the retailer's, product manufacturer's or distributor's reputation and financial performance. Additionally, the retailer, manufacturer and/or distributor may incur liability if a consumer is harmed by the contaminated product.

SUMMARY OF THE INVENTION

In one embodiment of the invention, an induction heat-seal liner is provided that allows a scent or aroma from a product to be detected through the seal, and/or allows a visual inspection of the product to be made through the seal, while the seal remains secured to the container. In another embodiment, a dual heat-seal liner having a dispensing aperture is provided that heat seal bonds to both the cap and container to form a non-removable closure assembly that protects the metal-foil layer from degradation by the product being dispensed.

In one embodiment of the invention, an induction heat-seal liner is provided comprising:

a top closure-facing layer, a bottom heat-seal bonding layer, and an intermediate metal-foil layer disposed in a thickness direction between the top and bottom layers, the top, bottom and intermediate layers being bonded to form an integral induction heat-seal liner, the metal-foil layer having a central opening surrounded by a metal-foil portion configured to lie above a container rim surrounding an open mouth of a container body, and the bottom layer having a heat-seal bonding area configured to lie above the container rim that is activated by heating of the metal-foil portion to induction heat-seal the bonding area to the container rim.

In one embodiment, the liner has a central portion, aligned in the thickness direction with the central opening of the metal-foil layer, comprising one or more materials or spaces that provide visibility into and/or aroma penetration from the open mouth of the container, allowing visible detection of and/or aroma detection of a product in the container body.

In one embodiment, one or both of the top and bottom layers fills or partially fills the central opening of the metal-foil layer.

In one embodiment, the integral liner comprises an adhesive, extrusion or thermally laminated body.

In one embodiment, the liner is an adhesive laminated body and includes adhesive between one or more of the top, intermediate and bottom layers, and the adhesive fills or partially fills the central opening of the metal-foil layer.

In one embodiment,
the central liner portion is clear or translucent to permit visible detection of the product in the container body.

In one embodiment, a method of forming the liner comprises:
a) providing the metal-foil layer having the central opening; and subsequently
b) laminating the metal-foil layer between the top and bottom layers to form the integral liner.

In one embodiment,
the laminating step comprises adhesive laminating the metal-foil layer between the top and bottom layers.

In one embodiment,
during the laminating step adhesive layers fills or partially fills the central opening of the metal-foil layer.

In one embodiment,
the providing step includes providing a support layer having a central opening, and
the laminating step includes disposing the metal-foil layer and the support layer with their central openings aligned between the top and bottom layers to form the integral liner.

In one embodiment,
the providing step includes providing a sheet comprising the metal-foil layer and a sheet comprising the support layer, and forming the central openings through both sheets simultaneously.

In one embodiment, the method of forming the liner comprises:
a) providing top, intermediate and bottom sheets for forming the top, intermediate and bottom layers respectively;
b) laminating the sheets together to form a laminated composite sheet with the intermediate sheet laminated between the top and bottom sheets; and
c) forming individual liners from the laminated composite sheet by cutting through the composite sheet in a thickness direction.

In one embodiment, the central opening in the metal foil layer is formed prior to the laminating step.

In one embodiment, during the laminating step the central opening is wholly or partially filled in.

In one embodiment, the method is a sequential in-line method including steps of:
prior to the laminating step, forming the central openings for a plurality of liners in the intermediate sheet;
the laminating step comprises feeding the sheets through one or more roller pairs for laminating the sheets together to from the laminated composite sheet;
the forming step comprises cutting through the laminated composite sheet in the thickness direction to form the plurality of liners.

In one embodiment, the steps of forming the central openings and cutting to form the individual liners each comprise hole punching.

In one embodiment, the central opening and individual liner are formed simultaneously.

According to another embodiment of the invention, a dual induction heat-seal liner is provided comprising:
a top closure-facing heat-seal bonding layer, a bottom heat-seal bonding layer, and an intermediate metal-foil layer disposed in a thickness direction between the top and bottom layers,
the top, bottom and intermediate layers being bonded to form an integral dual induction heat-seal liner,
the metal-foil layer having a central opening surrounded by a metal-foil portion configured to lie above a container rim surrounding an open mouth of a container body, and the bottom layer having a heat-seal bonding area configured to lie above the container rim that is activated by heating of the metal-foil portion to induction heat-seal the bottom layer bonding area to the container rim,
the liner having a central through-hole aligned in the thickness direction and extending through the central opening of the metal-foil layer and though the top and bottom layers,
the top closure-facing layer having a heat-seal bonding area to induction heat-seal the top layer bonding area to an inner surface of a closure, thus heat-seal bonding the liner to both the container rim and the closure inner surface, while allowing a product to be dispensed through the open mouth of the container, the central through-hole of the liner, and out of a dispensing aperture of the closure.

In one embodiment,
one or both of the top and bottom layers partially fills the central opening of the metal-foil layer to form a perimeter of the central-though hole that prevents contact between the product and the metal-foil layer.

In one embodiment,
the integral liner comprises an adhesive, extrusion or thermally laminated body.

In one embodiment,
the liner has a circular or a multi-sided perimeter.

In one embodiment,
the liner is an adhesive laminated body and includes adhesive between one or more of the top, intermediate and bottom layers, and the adhesive partially fills the central opening of the metal-foil layer to form a perimeter of the central though-hole that prevents contact between the product and the metal-foil layer.

In one embodiment, a method of forming the liner is provided comprising:
a) providing the metal-foil layer having the central opening; and subsequently
b) laminating the metal-foil layer between the top and bottom layers to form the integral liner.

In one embodiment,
the laminating step comprises adhesive laminating the metal-foil layer between the top and bottom layers.

In one embodiment,
during the laminating step adhesive partially fills the central opening of the metal-foil layer to form a perimeter of the central though-hole that prevents contact between the product and the metal-foil layer.

In one embodiment,
the providing step includes providing a support layer having a central opening, and
the laminating step includes disposing the metal-foil layer and the support layer with their central openings aligned between the top and bottom layers to form the integral liner.

In one embodiment,
the providing step includes providing a sheet comprising the metal-foil layer and a sheet comprising the support layer, and forming the central openings through both sheets simultaneously.

In one embodiment, a method of forming the dual induction heat-seal liner is provided comprising:
a) providing top, intermediate and bottom sheets for forming the top, intermediate and bottom layers respectively;
b) laminating the sheets together to form a laminated composite sheet with the intermediate sheet laminated between the top and bottom sheets; and c) forming individual liners from the laminated composite sheet by cutting through the composite sheet in a thickness direction.

In one embodiment, the central opening in the metal foil-layer is formed prior to the laminating step.

In one embodiment, during the laminating step the central opening is partially filled to form a perimeter of the central though-hole that prevents contact between the product and the metal-foil layer.

In one embodiment, the method is a sequential in-line method including steps of:

prior to the laminating step, forming the central openings for a plurality of liners in the intermediate sheet;

the laminating step comprises feeding the sheets through one or more roller pairs for laminating the sheets together to from the laminated composite sheet;

the forming step comprises cutting through the laminated composite sheet in the thickness direction to form the plurality of liners.

In one embodiment, the steps of forming the central openings and cutting to form the individual liners each comprise hole punching.

In one embodiment, the central through-holes and individual liners are formed simultaneously.

In one embodiment, the method includes subsequent to forming the central openings, forming the through-holes, followed by forming the liners.

BRIEF DESCRIPTION OF THE DRAWINGS

The above and further advantages and features of various embodiments of the invention will be understood by referring to the following description in conjunction with the accompanying drawings in which.

DETAILED DESCRIPTION OF THE INVENTION

Figure 1:
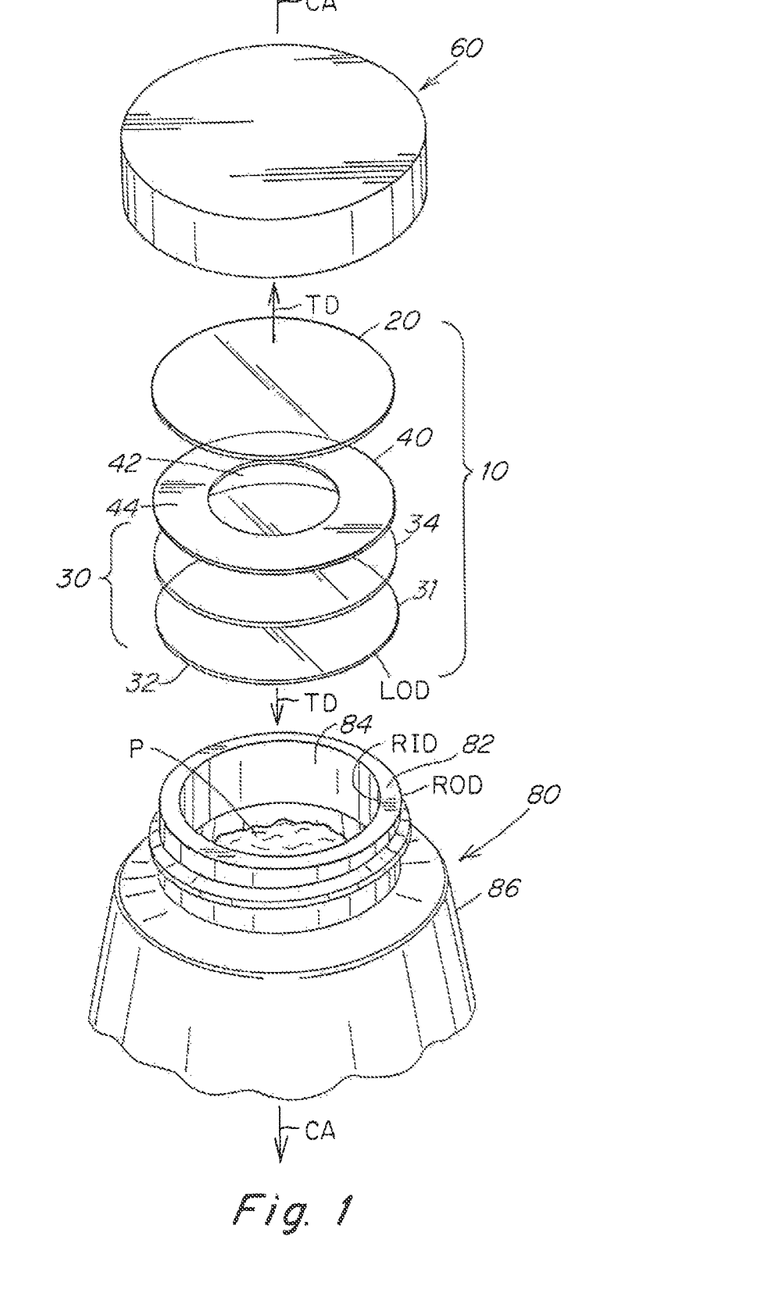
FIG. 1 is an exploded perspective view of an induction heat-seal liner positioned between a cap and container rim according to one embodiment of the invention, the liner components being shown as separate layers of a multi-layer structure prior to lamination to form an integral liner.
Figure 2:
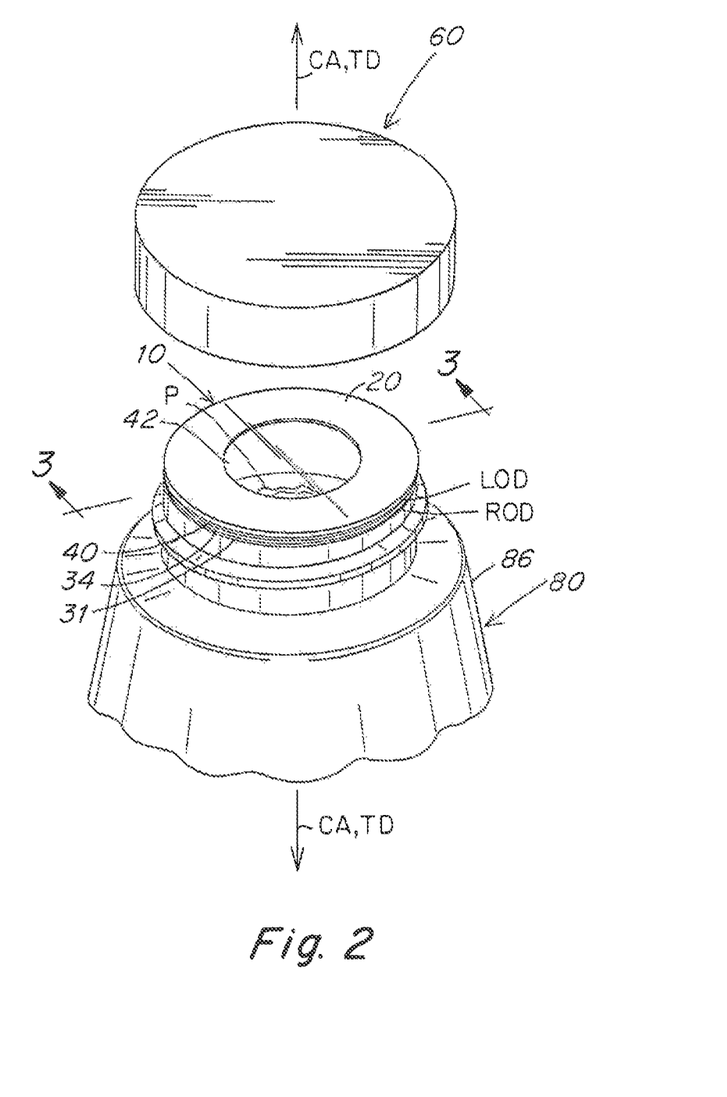
FIG. 2 is an exploded perspective view similar to FIG. 1 but showing the integral liner after lamination.

FIGS. 1-4 illustrate one embodiment of an induction heat-seal liner 10 according to one embodiment of the invention. FIG. 1 shows the liner components as multiple layers, prior to lamination to form the integral liner 10 shown in FIGS. 2-4. The liner 10 includes:

a top closure-facing layer 20, a bottom heat-seal bonding layer 30, and an intermediate metal-foil layer 40 disposed in a thickness direction (TD) between the top and bottom layers, the top, bottom and intermediate layers being bonded to form an integral induction heat-seal liner 10, the metal-foil layer 40 having a central opening 42 surrounded by a continuous metal-foil portion 44 configured to lie above a container rim 82 surrounding an open mouth 84 of a container body 86, and the bottom layer 30 having a heat-seal bonding area 32 configured to lie above the container rim 82 that is activated by heating of the continuous portion 44 to heat-seal bond the bottom layer 30 to the container rim 82.

As shown in FIG. 1, the multiple component layers of the unassembled liner include in serial order from top to bottom: top layer 20; intermediate metal-foil layer 40; and bottom layer 30, the bottom layer including an upper layer 34 and a lower heat-seal bonding layer 31. The layers 20, 40, 30 (34 and 31) are shown stacked in a thickness direction TD aligned with a central vertical axis CA of the container body 86 and closure cap 60. In this embodiment the container mouth has an annular rim 82, lying between a rim inner circumferential diameter RID and a rim outer circumferential diameter ROD, with the liner 10 having a matching liner outer circumferential diameter LOD equal to ROD of the container rim. The liner outer diameter LOD can be equal to or greater than the rim outer diameter ROD.

In various embodiments, the top, intermediate and bottom component layers 20, 40, 30 may each comprise a single layer, or multiple layers; they may include adhesive layers for adhesively laminating the layers together to form the integral liner 10, as described hereinafter (adhesive layers A shown in FIGS. 3-4).

Figure 3:
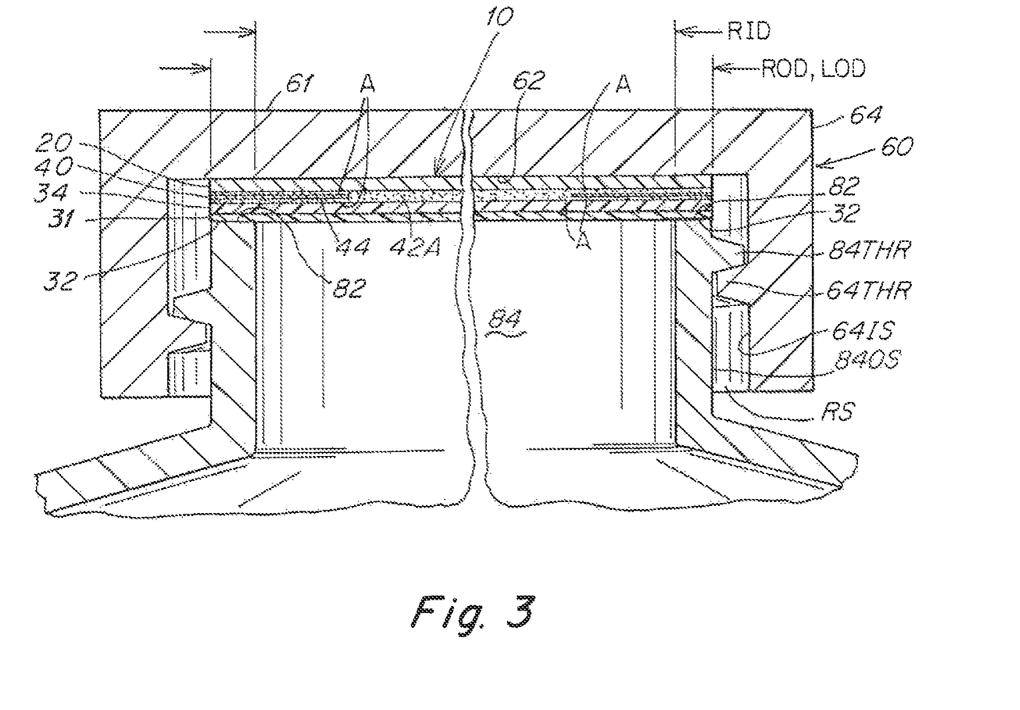
FIG. 3 is a cross-sectional view taken along line 3-3 of FIG. 2.

As shown in FIG. 3, the liner is configured to lie between the annular container rim 82 and an inner top wall 62 of the cap 60, in order to seal an open mouth 84 of the container 80. The lower heat-seal bonding layer 31 has a continuous peripheral portion 32 that lies over and is heat-seal bonded to the rim 82, the bonding being activated by induction heating of the metal-foil portion 44 that in turn heats the bonding portion 32.

Figure 10A:
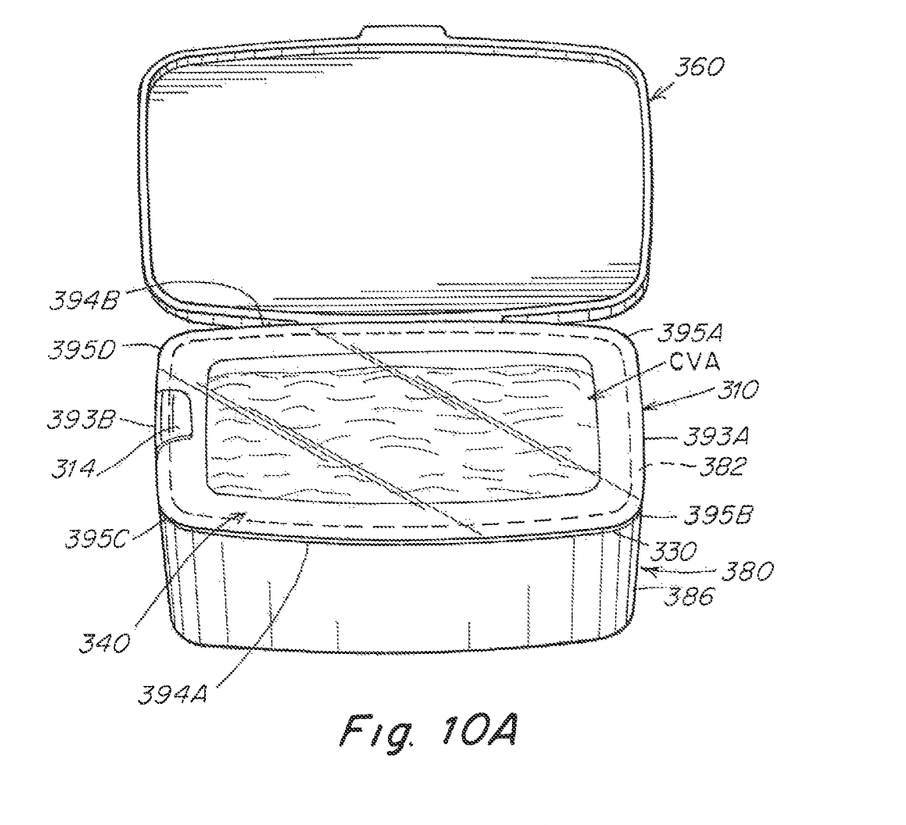
FIG. 10A is a top perspective view of an alternative liner embodiment, similar to that of FIGS. 1-4, but configured for a generally rectangular-shaped container, liner and cap.

The cap 60 is sized to cover the open mouth 84 of the container 80; the cap includes a cylindrical top wall 61 having a peripheral sidewall 64 extending downwardly from the outer periphery of the top wall 61. The inner surface 64IS of the cap sidewall, and the outer surface 84OS of the container mouth, include complimentary threads 64THR and 84THR that are disposed in a radial space RS between 64IS and 84OS. In use, the liner 10 is disposed in the cap 60 adjacent the inner top wall 62, and the cap is then twisted down onto the container rim 82 by threadably engaging 64THR and 84THR to secure the liner between the cap inner wall 62 and the container rim 82. The sealed container 80 can be readily opened (e.g. by the consumer) by untwisting the cap (in the opposite direction) to unthread 64THR and 84THR, allowing the consumer to remove the cap and then remove the heat-seal liner 10 by peeling the liner from the rim (this later step may be aided by providing a pull tab (e.g., 314 as shown in FIG. 10) on the liner to facilitate grasping the liner and pulling it away from the container rim).

The liner of the present embodiment provides a number of advantageous features that will now be described. One feature of the liner is to provide the metal-foil layer 40 with a central opening 42 (a through hole in the thickness direction TD); this positions the peripheral metal-foil area 44 (surrounding the central opening 42) where it is most useful for induction heating, i.e., over the container rim, and reduces the amount of metal foil material required. The central opening 42 in the foil also enables the liner to be see-through, wherein the user can view (visually detect) the contents (product P) in the sealed container, without removing the heat-seal liner 10 from the container rim 82 (as shown in FIG. 4). This may be advantageous for sale or display purposes, e.g., allowing a visual inspection of the product prior to purchase, without removal of the seal (and avoiding contamination of the product by a prospective purchaser). To provide this feature, the other layers of the liner (i.e., top and bottom layers 20 and 30) of the liner, or at least a central viewing area CVA of the other layers that overlie the central opening 42, must also be made of materials that allow visibility into the sealed container. Another beneficial feature is to provide a liner that allows an aroma from the product to pass through the central opening 42 and the CVA of the other layers 20, 30 of the heat-seal liner. This again may be advantageous for sale or display purposes. Various materials to accomplish these purposes are described below.

Figure 4:
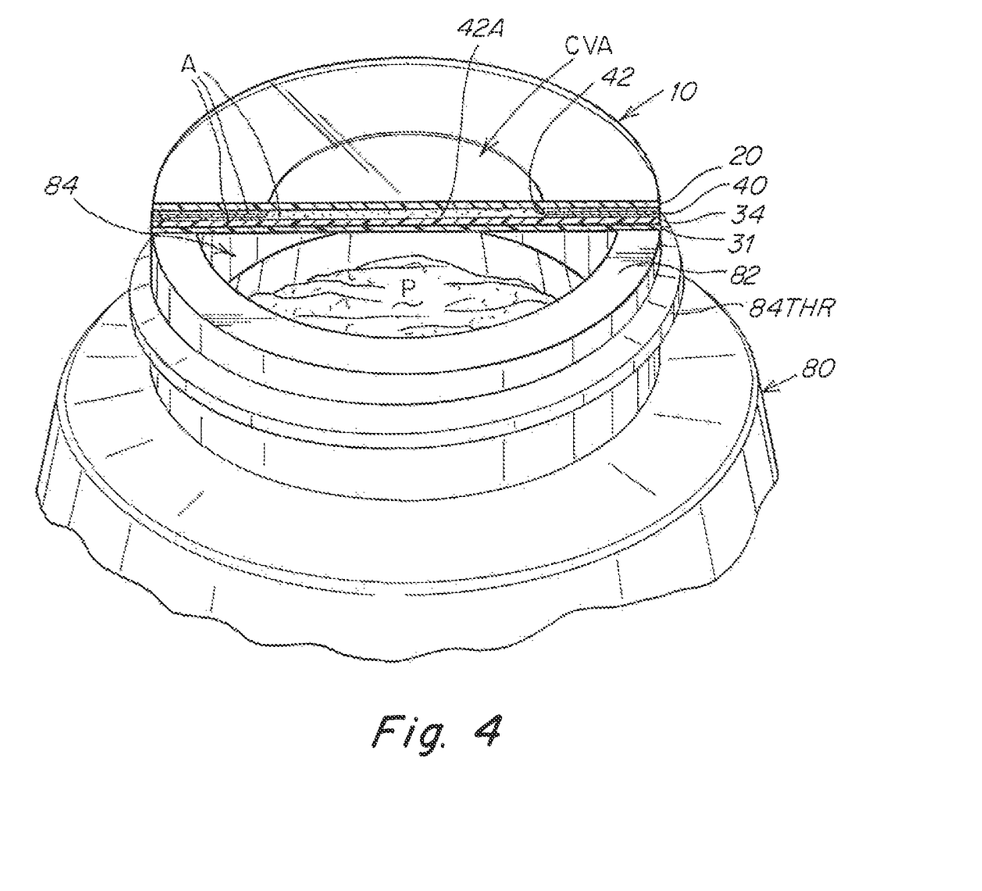
FIG. 4 is an enlarged fragmentary perspective view, partially broken away, of the liner of FIG. 2 sealed to the container rim and with the cap removed, allowing the consumer to view and/or detect an aroma of the product through the liner.

As shown in FIGS. 3-4, and described below in one method embodiment for making the liner 10, adhesive layers A may be provided between the top layer 20 and the intermediate layer 40, and between the bottom layer 30 and the intermediate layer 40, to enable adhesive lamination of all liner components to form an integral liner 10. In this embodiment, the adhesive A has flowed into the central opening 42 during lamination, to fill the opening with adhesive 42A; this may strengthen the overall liner structure. However, to maintain the CVA (central viewing area through all liner layers aligned within OD of central opening 42) the adhesive area 42A must also be of a see-through material (by see-through it is meant that a person is able to perceive (detect) with a human eye, the interior contents P of the container). Similarly to allow for aroma detection by a human nose, the adhesive area 42A must provide for aroma penetration in the CVA. As noted previously, the adhesive layer(s) may be included as part of (a component layer of) any one or more or the top layer 20, intermediate layer 40, or bottom layer 30.

Figure 5A:
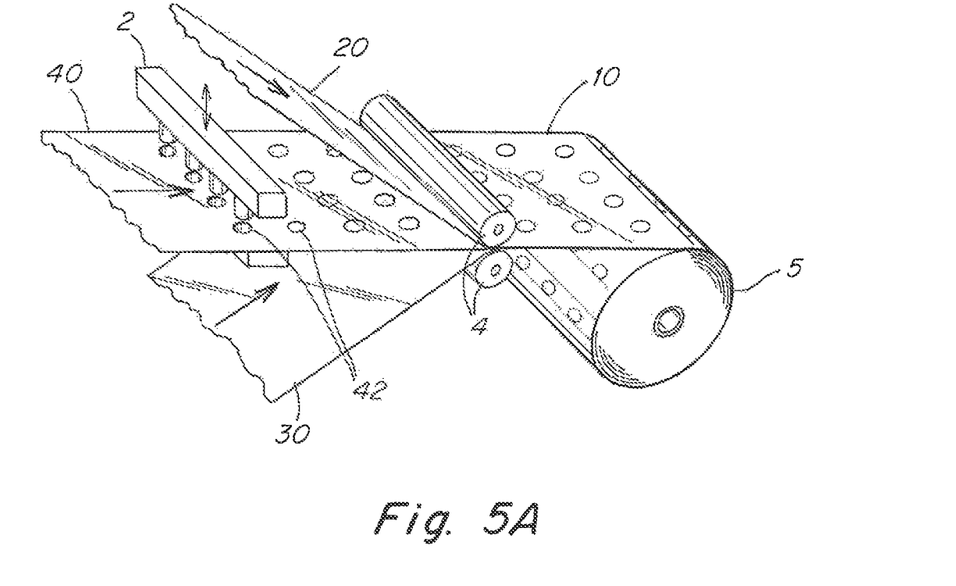
FIGS. 5A-5B are schematic views of a method of making the liner of FIGS. 1-4 from three component sheets, FIG. 5A showing an intermediate layer sheet being first hole punched (to form central openings in the intermediate metal-foil layer), followed by the three sheets (top, hole-punched intermediate and bottom) being sent through the nip of a pair of rotating rollers for forming a laminated web, and FIG. 5B showing a subsequent step of hole punching through all layers of the laminated web to form individual liners.
Figure 5B:
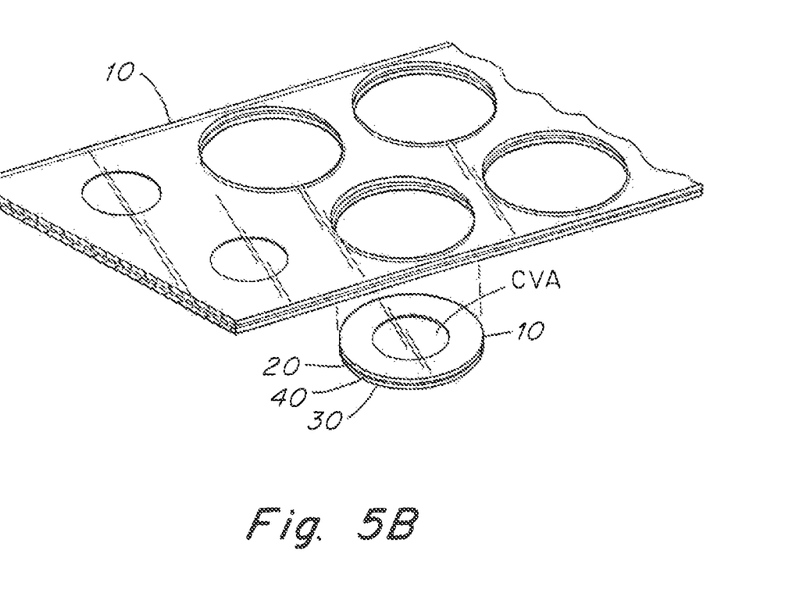

FIGS. 5A-5B are schematic views of one method embodiment for making a plurality of liners of the type shown in FIGS. 1-4, i.e., by laminating together three component sheets that form the top, intermediate (metal foil) and bottom layers of the liner respectively. FIG. 5A shows a hole punch 2 forming the central openings 42 in an intermediate (metal-foil) layer sheet (40-sheet), followed by the top 20-sheet, hole-punched intermediate 30-sheet and bottom 30-sheet layer sheets) being sent through the nip of a pair of rotating rollers 4 for forming a laminated composite sheet or web (10-sheet or 10-web). The laminated sheet-10 is then wound on a large roller 5 (e.g., for storage/transport prior to subsequent processing). FIG. 5B shows a subsequent hole punching step for forming a plurality of individual liners 10 by cutting completely through the thickness direction of the composite sheet 10-sheet (i.e., hole punching to form the outer diameter LOD of each liner 10). Alternatively, the steps of FIGS. 5A and 5B can be combined into one sequential in-line process by eliminating the step of winding onto the large roller 5 prior to hole punching the individual liners.

Figure 6:
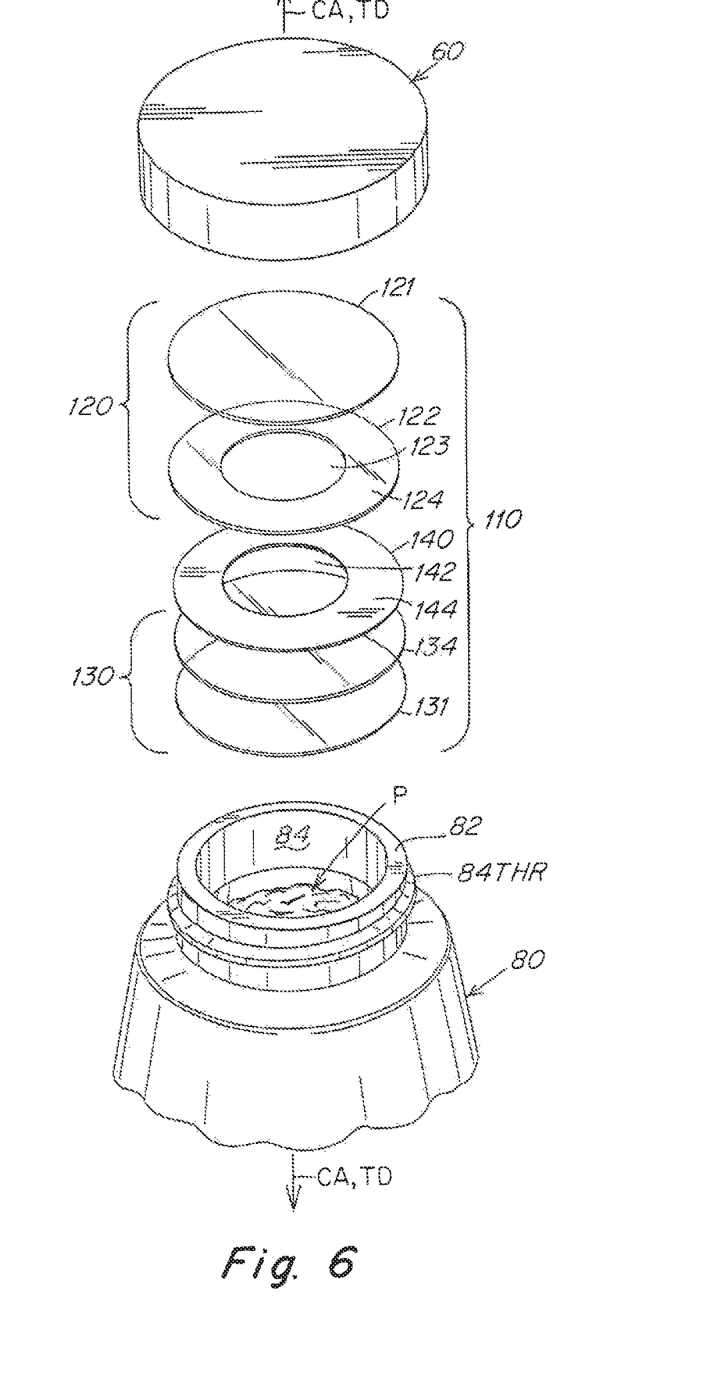
FIG. 6 is an exploded perspective view of an alternative liner embodiment similar to that of FIGS. 1-4, showing the separate layer components again positioned between a cap and container rim, this embodiment including an additional support layer having a central opening.

FIG. 6 shows an alternative liner embodiment 110 (similar to FIGS. 1-4) that includes a further support layer 122 for structurally supporting the metal-foil layer prior to, during and/or after assembly. The view of FIG. 6 is similar to that of FIG. 1, showing the separate component (top, intermediate, bottom) layers of the liner in a spaced-apart, vertically-aligned position (in the thickness direction TD) between the cap 60 and container rim 82, with like layers of the liner bearing similar reference numbers but in a "100" numbering series. In this embodiment the liner 110 includes in serial order from top to bottom: a continuous uppermost layer 121, a support layer 122 having a central opening 123 surrounded by a continuous peripheral area 124 (here the layers 121 and 122 together comprising a top layer 120); an intermediate metal-foil layer 140 having a central opening 142 and a surrounding continuous metal-foil peripheral area 144; and a bottom layer 130 (including an upper layer 134 and a lower layer 131, the same as in the FIG. 1 embodiment). In various embodiments, the support layer 122 can be provided above or below the metal-foil layer 140, and can be a component of any of the top, intermediate or bottom layers as desired by a particular application.

Providing the support layer 122 with a central opening 123 enables benefits both in the final (laminated) liner assembly 110, such as preventing wrinkling or tearing of the metal-foil layer 140. It also provides benefits during manufacture, e.g., in the process of FIG. 9A (described further below), starting with a sheet of a support layer material and a sheet of a metal-foil material in planar, face-to-face engagement (together comprising the intermediate 240-sheet of FIG. 9A), the two sheets can be hole-punched at the same time by initial hole punch 202 forming central openings 123, 142, in both the support layer 122 and metal-foil layer 140 simultaneously.

In one embodiment, a polymer film (forming support layer 122) can be applied to one surface of a metal-foil sheet (forming metal-foil layer 140) by an adhesive lamination process, e.g., use of a solvent adhesive to bond the layers. The central openings 123, 142 in both the support layer 122 and the metal-foil layer 140 can be the same size as the rim inner diameter RID, or can be less than RID (e.g., the size can be adjusted depending on the desired visibility through the liner, and/or aroma penetration through the liner, based on the various material properties and dimensions of the liner layers).

Figure 7:
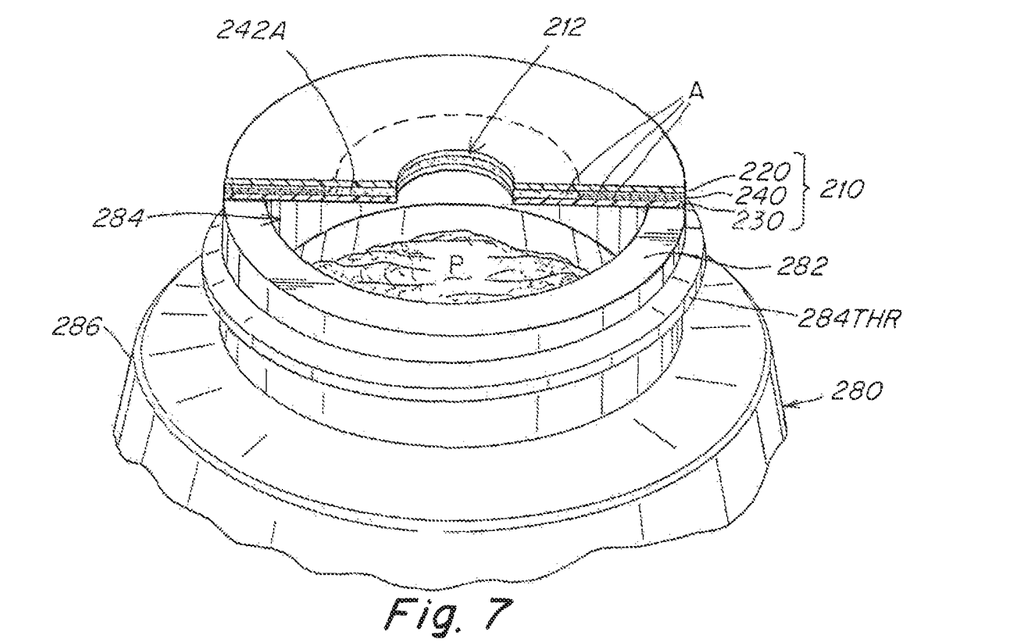
FIG. 7 is an enlarged fragmentary perspective view, partially broken away, of an alternative embodiment of a liner for forming a non-removable cap, liner and container assembly, showing the liner heat-seal bonded to the container rim (without the cap)
Figure 8:
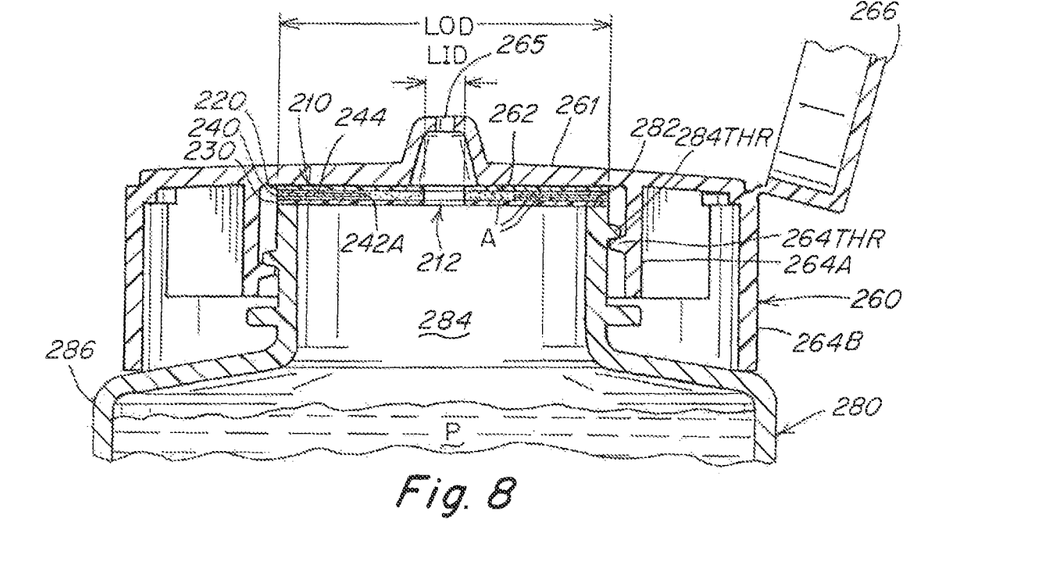
FIG. 8 is a cross-sectional view of the assembled cap, liner and container assembly of FIG. 7, showing the liner heat-seal bonded to both the inner top wall of the cap (above the liner) and the container rim (below the liner) to form a non-removable closure assembly.

FIGS. 7-8 illustrate an alternative embodiment, referred to as a dual heat-seal liner, configured to be induction heat-sealed on its opposing top and bottom faces to the cap interior top wall and the container rim (e.g., during the filling/capping step at the product filler) to form a non-removable closure assembly. Containers with a non-removable closure (cap/liner) assembly, are commonly used for food products such as ketchup, mayonnaise, salad dressing and other products that can be conveniently packaged and dispensed through a dispensing aperture of a squeezable container assembly without removing the closure. In the embodiment of FIGS. 7-8, the dual-heat seal liner 210 includes at least one central opening 212 extending in the thickness direction TD through all component layers 220, 240, 230 so as to form a dispensing aperture 212 extending through the entire thickness of the liner 210. This liner can be used with a cap 260, as shown in FIG. 8, also having a dispensing aperture 265, wherein the cap 260, liner 210 and container 280 together form the non-removable closure assembly configured to be used (by the consumer) to dispense a product P held in the container body 286 without removal of the cap 260 or of the induction heat-seal liner 210. The cap has a hinged closure lid 266, such as a flip top, for closing the dispensing aperture 265 when not in use (and to protect the product P from spoilage). Typically the manufacturer does not want the container to be re-filled, and thus the liner includes, in addition to the heat-seal bottom layer 230 for induction heat-seal bonding to the container rim 282, a heat-seal top layer 220 for induction heat-seal bonding to the inner top wall 262 of the cap, rendering the cap non-removable from the combined (dual induction heat-seal bonded) cap, liner, and container assembly.

Figure 9A:
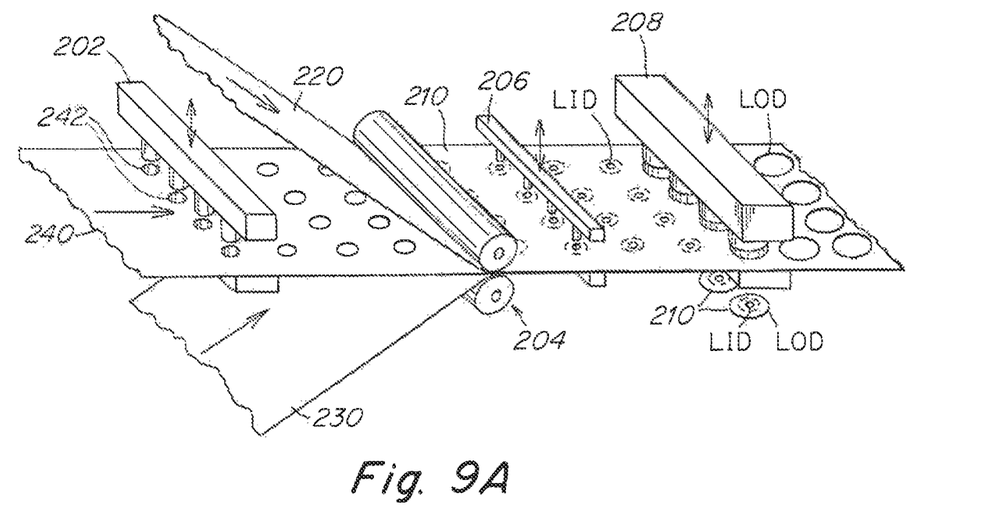
FIG. 9A is a schematic view of one method of making the liner of FIGS. 7-8, showing three component layer sheets (top, intermediate and bottom) wherein the (metal foil) intermediate sheet is first hole punched (initial hole punch) to form central openings in the metal foil, followed by all three sheets being sent through the nip of a pair of rotating rollers for forming a laminated web, followed by common hole punching (by liner ID hole punch) through all three layers of the laminated web to form the common opening (liner ID), and followed by a third hole punching (by liner OD hole punch) to form individual liners.
Figure 9B:
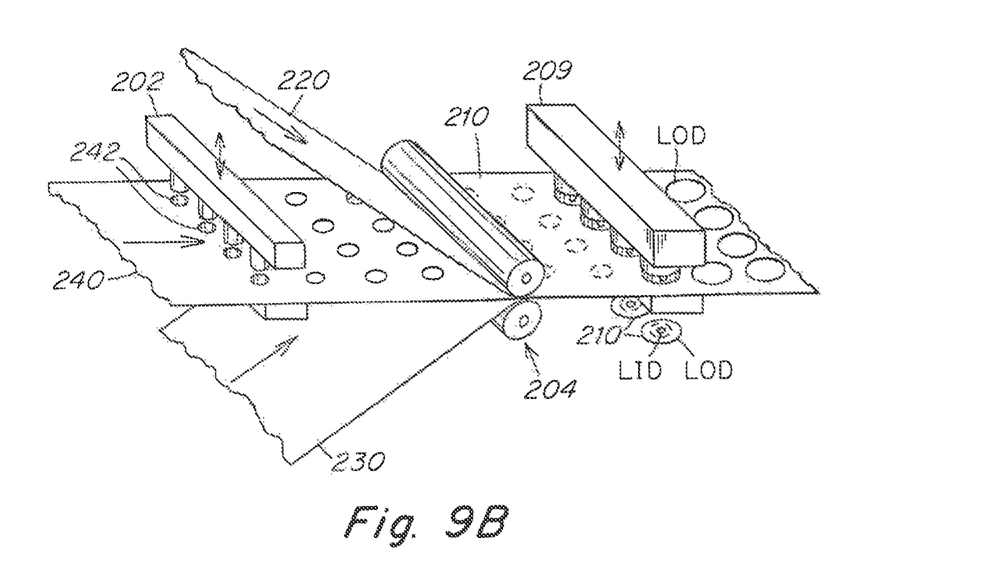
FIG. 9B is an alternative method of making the liner of FIGS. 7-8, similar to that of FIG. 9A but wherein the second and third hole punches of FIG. 9A, are combined into a single hole punch for forming both the liner OD and ID simultaneously.

FIG. 9A shows one method of making the dual-seal liner 210 of FIGS. 7-8. A sequential in-line process is shown in which three layer sheets 220-sheet, 240-sheet, and 230-sheet are provided for forming the top 220, intermediate 240 and bottom 230 layers respectively. In this embodiment, an initial hole punch 202 forms central openings 242 in the intermediate (metal-foil) sheet 240-sheet, the three sheets are then fed between a pair of rotating rollers 204 to laminate the sheets together to form a composite sheet or web 210-sheet, and then at least one common liner ID hole punch 206 forms the liner inner diameter through all three sheet layers (to form the liner ID). Subsequently a further liner OD hole punch 208 is used to form the liner outer diameter LOD for a plurality of liners 210. In various embodiments, the outer diameter LOD of liner 210 and the liner inner diameter LID (of central opening 212) can be made (e.g., punched) either simultaneously (e.g., by using a single liner ID/OD hole punch 209 as shown in FIG. 9B with inner and outer cutting rings to form the inner and outer liner diameters of the annular liner), or sequentially (typically punching 212 first and 210 second) as in FIG. 9A with hole punches 206, 208.

Also advantageous in this embodiment, the metal-foil layer 240 can have an initial central opening 242 that is larger (e.g., of greater diameter) than the common central opening 212 (liner ID), and the material(s) of the top and/or bottom layers 220, 230 (or adhesive A forming part of those layers) is then allowed to flow into or otherwise fill the space defined by the initial central opening 242 (in the metal-foil layer 240), so as to fully or partially fill that space with adhesive 242A. The fully or partially filled space provides an area that surrounds the periphery of the central opening 212 in the metal-foil layer 240, in order to prevent the product P that is being dispensed through the common central opening 212, from reaching the metal-foil peripheral portion 244 of layer 240. This prevention (of product to metal-foil contact) will reduce the damaging effects of such contact which may include one or more of corrosion of the metal-foil layer, delamination of the liner layers, and/or a defective heat-seal bond with the container rim or the inner top wall of the cap.

The liners described herein may be manufactured from various materials and by various methods to achieve the aforementioned advantages.

As used herein the top, bottom and/or intermediate layers may be single layer or multi-layer embodiments, wherein one or more layers is provided as a coating layer, and/or one or more layers are continuous or less than continuous across the liner area (in a direction transverse to the thickness direction).

In various embodiments, the top, bottom and/or intermediate layers may include one or more polymer materials, such as polyolefins (e.g., polypropylene (PP) or polyethylene (PE) based polymers), polyesters (e.g., polyethylene terephthalate (PET) based polymers), polyamides (e.g., nylon based polymers), including copolymers, and blends thereof. Furthermore, one or more paper layers may be present.

In various embodiments, the metal-foil layer may be formed of one or more of metals, such as aluminum (Al), tin, copper or steel.

The liner may be formed by any one of various lamination methods, including adhesive lamination, extrusion lamination or thermal lamination (without adhesives). For adhesive lamination, the adhesive layers may comprise one or more of the top, bottom or intermediate layers, adjacent to the intermediate metal-foil layer, and/or between other layers of a multi-layer structure. The adhesive (glue) can be applied to the top or bottom layers, e.g., a PET heat seal layer, or to a polypropylene layer. It may be less preferred (e.g., more difficult) to apply adhesive to the metal-foil layer because of the central opening.

The induction heat-seal bonding material may be included in the top and/or bottom layers as a surface layer, e.g., as a solvent coating to a base film (e.g., DuPont Teijin Mylar CL Polyester Film), as an extrusion coating to a base film (e.g., as a hot melt adhesive), or as a distinct layer. The induction heat-seal bonding materials may comprise one or more polymer materials that bond in a temperature range of from 60 to 210 degrees Celsius. Representative materials include polyolefin, polyester and nylon materials. Typically the heat-seal material is a continuous layer across the entire liner area (transverse to the thickness direction TD); however it can be a partial layer that is applied only to the liner periphery where needed to bond to the container rim (i.e., a continuous peripheral area around the periphery of the liner).

The material used for the cap and container will depend upon the particular application. In one embodiment, the cap is made of polypropylene (PP), and the container is made from polyethylene terephthalate (PET), polypropylene (PP) or polyethylene (PE). The container may be made from an injection molded preform, the body portion of which is blow molded to form the container body. The rim may have an OD in a range of 28-89 mm, and a wall thickness in a range of 0.045 to 0.110 inch. For the non-removable closure embodiment, the dual heat-seal bonded cap, liner and container assembly can preferably withstand a torque or at least 50 inch-pounds, and more preferably 70 inch-pounds, without loss of the dual heat-seal bonds or distortion of the cap or container.

In one adhesive lamination method embodiment, the three component layers (top, intermediate, bottom) of the liner can be laminated in one step, by first applying adhesive to the top and bottom layers and sending all three layers (with the hole-punched metal-foil intermediate layer in the middle) through a nip of a pair of rotating rollers as shown in FIG. 5A or 9A. Alternatively, a sequential process can be used to join the layers.

In one heat lamination method embodiment, a support film of PET/EAA can be used (e.g., Dow Primacor Ethylene Acrylic Acid) that adheres well to Al foil to form the intermediate layer. All three layers (top and bottom, with the intermediate layer in between) are then sent through a nip of a pair of rotating rollers as shown in FIG. 5A or 9A, while applying heat and pressure to form the integral liner.

Figure 10B:
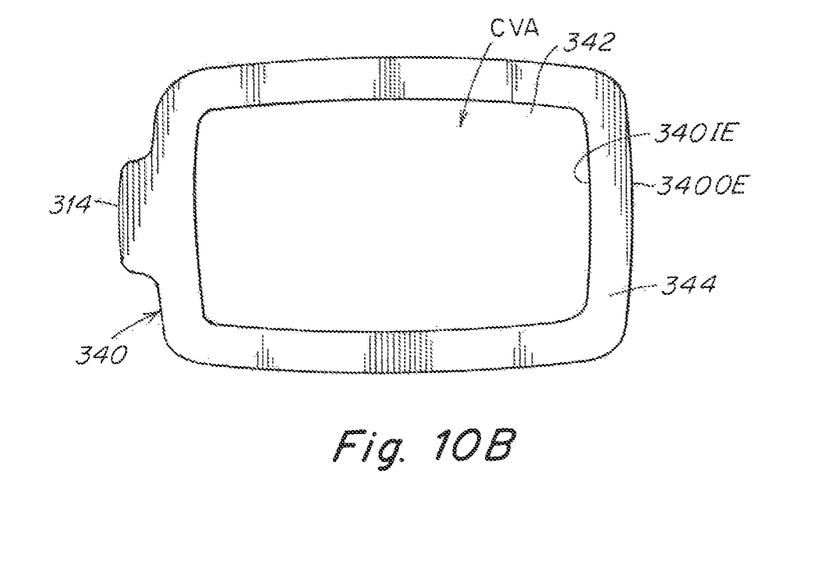
FIG. 10B is a top perspective view of the liner of FIG. 10A.

The shape of the container rim, and complementary liner shape, is not required to be disc (circular) or annular (ring-shaped). Other rim shapes can be utilized, including any multi-sided shape with straight or curved sides, having sharp or rounded junctions between the sides. Another embodiment shown in FIGS. 10A-10B, similar to the FIGS. 1-4 embodiment. The FIG. 10A embodiment includes a cap 360, liner 310, and container 380 assembly where the container rim 382 and the liner 310 are generally rectangular in shape (in cross section transverse to the thickness direction TD), with two opposing relatively straight right and left outer side edges 393A and 393B, two opposing outwardly-bowed front and rear outer side edges 394A and 394B, and rounded corners 395 there between. The liner includes a pull tab 314 as previously mentioned to assist in removing (pulling) the liner 310 off of the container rim 382 to access the product P held in the container body 386. The container 380 is designed to hold an aromatic product, and the scent of the product (held in the container body) can be detected (by a human nose) through a CVA of the liner (defined by inner edge 3401E of the intermediate metal-foil layer 340). Here the CVA may allow just aroma detection, or alternatively can allow both visual detection and aroma detection of the product in the container (through the CVA of the liner), or just visual detection. FIG. 10B shows the metal-foil intermediate layer 340, having a central opening 342 surrounded by a peripheral metal-foil area 344, the latter for activating heating of the heat-seal bonding material 330 for bonding to the container rim 382.

There are multiple applications where visual detection, and/or aroma detection, would be of great value to the consumer, and where the container must also provide protection against leakage, spoilage or contamination of the product and thus requiring use of a heat-seal liner. Products that would benefit from visual and/or aroma detection, without removal of the heat-seal liner, include products such as foods, beverages, cosmetics, confectionery, household products, air care and other items in the form of creams, gels, powders, liquids or solids, so as to permit the scent or aroma of the product to be released though the seal (or visual observation of the product) without providing direct access to the product.

These and other alternative embodiments are intended to fall within the scope of the pending claims.

What is claimed is:

1. A dual induction heat-seal liner comprising:

a top closure-facing heat-seal bonding layer, a bottom heat-seal bonding layer, and an intermediate metal-foil layer disposed in a thickness direction between the top and bottom layers, the top, bottom and intermediate layers being bonded to form an integral dual induction heat-seal liner, the metal-foil layer having a central opening surrounded by a metal-foil portion configured to lie above a container rim surrounding an open mouth of a container body, and the bottom layer having a heat-seal bonding area configured to lie above the container rim that is activated by heating of the metal-foil portion to induction heat-seal the bottom layer bonding area to the container rim, the liner having a central through-hole aligned in the thickness direction that includes the central opening of the metal-foil layer and further extends though the top and bottom layers, the top closure-facing layer having a heat-seal bonding area to induction heat-seal the top layer bonding area to an inner surface of a closure, thus heat-seal bonding the liner to both the container rim and the closure inner surface, while allowing a product to be dispensed through the open mouth of the container, the central through-hole of the liner, and out of a dispensing aperture of the closure, and one or both of the top and bottom layers partially fills the central opening of the metal-foil layer to form a perimeter of the central-though hole that prevents contact between the product and the metal-foil layer.

2. The liner of claim 1 wherein:

the integral liner comprises an adhesive, extrusion or thermally laminated body.

3. The liner of claim 1, wherein:

the liner has a circular or a multi-sided perimeter.

4. The liner of claim 1 wherein:

the liner is an adhesive laminated body and includes adhesive between one or more of the top, intermediate and bottom layers, and the adhesive partially fills the central opening of the metal-foil layer to form a perimeter of the central though-hole that prevents contact between the product and the metal-foil layer.

5. A method of forming the liner of claim 1 comprising:

a) providing the metal-foil layer having the central opening; and subsequently b) laminating the metal-foil layer between the top and bottom layers to form the integral liner.

6. The method of claim 5 wherein:

the laminating step comprises adhesive laminating the metal-foil layer between the top and bottom layers.

7. The method of claim 6 wherein:

during the laminating step adhesive partially fills the central opening of the metal-foil layer to form a perimeter of the central though-hole that prevents contact between the product and the metal-foil layer.

8. The method of claim 5 wherein:

the providing step includes providing a support layer having a central opening, and the laminating step includes disposing the metal-foil layer and the support layer with their central openings aligned between the top and bottom layers to form the integral liner.

9. The method of claim 8 wherein:
the providing step includes providing a sheet comprising the metal-foil layer and a sheet comprising the support layer, and forming the central openings through both sheets simultaneously.

10. A method of forming the liner of claim 1 comprising:
a) providing top, intermediate and bottom sheets for forming the top, intermediate and bottom layers respectively;
b) laminating the sheets together to form a laminated composite sheet with the intermediate sheet laminated between the top and bottom sheets; and
c) forming individual liners from the laminated composite sheet by cutting through the composite sheet in a thickness direction.

11. The method of claim 10 wherein the central opening in the metal foil-layer is formed prior to the laminating step.

12. The method of claim 11 wherein during the laminating step the central opening is partially filled to form a perimeter of the central though-hole that prevents contact between the product and the metal-foil layer.

13. The method of claim 10 wherein the method is a sequential in-line method including steps of:
prior to the laminating step, forming the central openings for a plurality of liners in the intermediate sheet;
the laminating step comprises feeding the sheets through one or more roller pairs for laminating the sheets together to from the laminated composite sheet;
the forming step comprises cutting through the laminated composite sheet in the thickness direction to form the plurality of liners.

14. The method of claim 13 wherein the steps of forming the central openings and cutting to form the individual liners each comprise hole punching.

15. The method of claim 13 wherein the central through-holes and individual liners are formed simultaneously.

16. The method of claim 13 including subsequent to forming the central openings, forming the through-holes, followed by forming the liners.

17. A dual induction heat-seal liner comprising:
a top closure-facing heat-seal bonding layer, a bottom heat-seal bonding layer, and an intermediate metal-foil layer disposed in a thickness direction between the top and bottom layers,
the top, bottom and intermediate layers being bonded to form an integral dual induction heat-seal liner,
the metal-foil layer having a central opening surrounded by a metal-foil portion configured to lie above a container rim surrounding an open mouth of a container body, and the bottom layer having a heat-seal bonding area configured to lie above the container rim that is activated by heating of the metal-foil portion to induction heat-seal the bottom layer bonding area to the container rim,
the liner having a central through-hole aligned in the thickness direction that includes the central opening of the metal-foil layer and further extends though the top and bottom layers,
the top closure-facing layer having a heat-seal bonding area to induction heat-seal the top layer bonding area to an inner surface of a closure, thus heat-seal bonding the liner to both the container rim and the closure inner surface, while allowing a product to be dispensed through the open mouth of the container, the central through-hole of the liner, and out of a dispensing aperture of the closure, and wherein the liner is an adhesive laminated body and includes adhesive between one or more of the top, intermediate and bottom layers, and the adhesive partially fills the central opening of the metal-foil layer to form a perimeter of the central though-hole that prevents contact between the product and the metal-foil layer.

18. The liner of claim 17 wherein:
the integral liner comprises an adhesive, extrusion or thermally laminated body.

19. The liner of claim 17, wherein:
the liner has a circular or a multi-sided perimeter.

20. A method of forming the liner of claim 17 comprising:
a) providing the metal-foil layer having the central opening; and subsequently
b) laminating the metal-foil layer between the top and bottom layers to form the integral liner.

21. The method of claim 20 wherein:
the laminating step comprises adhesive laminating the metal-foil layer between the top and bottom layers.

22. The method of claim 21 wherein:
during the laminating step adhesive partially fills the central opening of the metal-foil layer to form a perimeter of the central though-hole that prevents contact between the product and the metal-foil layer.

23. The method of claim 20 wherein:
the providing step includes providing a support layer having a central opening, and
the laminating step includes disposing the metal-foil layer and the support layer with their central openings aligned between the top and bottom layers to form the integral liner.

24. The method of claim 23 wherein:
the providing step includes providing a sheet comprising the metal-foil layer and a sheet comprising the support layer, and forming the central openings through both sheets simultaneously.

25. A method of forming a dual induction heat-seal liner comprising:
a) providing a top closure-facing heat-seal bonding layer, a bottom heat-seal bonding layer, and an intermediate metal-foil layer disposed in a thickness direction between the top and bottom layers, the metal-foil layer having a central opening surrounded by a metal-foil portion configured to lie above a container rim surrounding an open mouth of a container body, and the bottom layer having a heat-seal bonding area configured to lie above the container rim that is activated by heating of the metal-foil portion to induction heat-seal the bottom layer bonding area to the container rim,
b) subsequent to the providing step, laminating the metal-foil layer between the top and bottom layers to form the integral liner, wherein
the liner having a central through-hole aligned in the thickness direction that includes the central opening of the metal-foil layer and further extends though the top and bottom layers, and
the top closure-facing layer having a heat-seal bonding area to induction heat-seal the top layer bonding area to an inner surface of a closure, thus heat-seal bonding the liner to both the container rim and the closure inner surface, while allowing a product to be dispensed through the open mouth of the container, the central through-hole of the liner, and out of a dispensing aperture of the closure.

26. The method of claim 25 wherein:
the laminating step comprises adhesive laminating the metal-foil layer between the top and bottom layers.

27. The method of claim 26 wherein:
during the laminating step adhesive partially fills the central opening of the metal-foil layer to form a perimeter of the central though-hole that prevents contact between the product and the metal-foil layer.

28. The method of claim 25 wherein:
the providing step includes providing a support layer having a central opening, and
the laminating step includes disposing the metal-foil layer and the support layer with their central openings aligned between the top and bottom layers to form the integral liner.

29. The method of claim 28 wherein:
the providing step includes providing a sheet comprising the metal-foil layer and a sheet comprising the support layer, and forming the central openings through both sheets simultaneously.

30. A method of forming a dual induction heat-seal liner comprising:
a) providing top, intermediate, and bottom sheets for forming a top closure-facing heat-seal bonding layer, a bottom heat-seal bonding layer, and an intermediate metal-foil layer disposed in a thickness direction between the top and bottom layers,
b) laminating the sheets together to form a laminated composite sheet with the intermediate sheet laminated between the top and bottom sheets, and
c) forming individual liners from the laminated composite sheet by cutting through the composite sheet in a thickness direction, each individual liner comprising top, bottom and intermediate layers bonded to form an integral dual induction heat-seal liner,
the metal-foil layer of each liner having a central opening surrounded by a metal-foil portion configured to lie above a container rim surrounding an open mouth of a container body, and the bottom layer having a heat-seal bonding area configured to lie above the container rim that is activated by heating of the metal-foil portion to induction heat-seal the bottom layer bonding area to the container rim,
the liner having a central through-hole aligned in the thickness direction that includes the central opening of the metal-foil layer and further extends though the top and bottom layers, and
the top closure-facing layer having a heat-seal bonding area to induction heat-seal the top layer bonding area to an inner surface of a closure, thus heat-seal bonding the liner to both the container rim and the closure inner surface, while allowing a product to be dispensed through the open mouth of the container, the central through-hole of the liner, and out of a dispensing aperture of the closure.

31. The method of claim 30 wherein the central opening in the metal foil-layer is formed prior to the laminating step.

32. The method of claim 31 wherein during the laminating step the central opening is partially filled to form a perimeter of the central though-hole that prevents contact between the product and the metal-foil layer.

33. The method of claim 30 wherein the method is a sequential in-line method including steps of:
prior to the laminating step, forming the central openings for a plurality of liners in the intermediate sheet;
the laminating step comprises feeding the sheets through one or more roller pairs for laminating the sheets together to from the laminated composite sheet;
the forming step comprises cutting through the laminated composite sheet in the thickness direction to form the plurality of liners.

34. The method of claim 33 wherein the steps of forming the central openings and cutting to form the individual liners each comprise hole punching.

35. The method of claim 33 wherein the central through-holes and individual liners are formed simultaneously.

36. The method of claim 33 including subsequent to forming the central openings, forming the through-holes, followed by forming the liners.

* * * * *